US008283636B2

(12) United States Patent
Hamann et al.

(10) Patent No.: US 8,283,636 B2
(45) Date of Patent: Oct. 9, 2012

(54) THERMALLY EXCITED NEAR-FIELD SOURCE

(75) Inventors: Hendrik F. Hamann, Yorktown Heights, NY (US); Snorri Ingvarsson, Reykjavik (IS); James A. Lacey, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/443,062

(22) Filed: Apr. 10, 2012

(65) Prior Publication Data
US 2012/0193536 A1 Aug. 2, 2012

Related U.S. Application Data

(63) Continuation of application No. 11/519,393, filed on Sep. 12, 2006, now Pat. No. 8,173,965.

(51) Int. Cl.
*G01J 5/02* (2006.01)
(52) U.S. Cl. .................................................. 250/341.1
(58) Field of Classification Search ..... 250/341.1–341.8
See application file for complete search history.

(56) References Cited

U.S. PATENT DOCUMENTS

| 4,604,520 | A | 8/1986 | Pohl | |
|---|---|---|---|---|
| 4,947,034 | A | 8/1990 | Wickramasinghe et al. | |
| 5,018,865 | A | 5/1991 | Ferrell et al. | |
| 5,441,343 | A | 8/1995 | Pylkki et al. | 374/137 |
| 5,624,845 | A | 4/1997 | Wickramasinghe et al. | 435/287.2 |
| 5,894,125 | A | 4/1999 | Brener et al. | 250/330 |
| 6,233,206 | B1 | 5/2001 | Hamann et al. | |
| 6,532,125 | B1 | 3/2003 | Hamann et al. | |
| 6,597,639 | B1 | 7/2003 | Hamann et al. | |
| 6,617,569 | B2 | 9/2003 | Narita et al. | 250/216 |
| 6,790,671 | B1 | 9/2004 | Austin et al. | 436/172 |
| 7,248,282 | B2 | 7/2007 | Maddison | 348/79 |
| 2002/0021451 | A1 | 2/2002 | Hill | 356/511 |
| 2002/0101795 | A1 | 8/2002 | Wickramasinghe et al. | 369/43 |
| 2002/0101812 | A1 | 8/2002 | Wickramasinghe et al. | 369/43 |
| 2004/0013385 | A1 | 1/2004 | Brennand et al. | 385/129 |
| 2004/0065819 | A1 | 4/2004 | Ando et al. | 250/234 |
| 2004/0085861 | A1 | 5/2004 | Hamann et al. | 369/13.01 |
| 2005/0230625 | A1 | 10/2005 | Zhang et al. | 250/341.1 |

OTHER PUBLICATIONS

B. Cretin, "Scanning near-field thermal and thermoacoustic microscopy: performances and limitations," 2004, Superlattices and Microstructures, vol. 35, pp. 253-268.*
U.S. Appl. No. 09/512,248, filed Feb. 24, 2000, Hamann et al.
U.S. Appl. No. 09/540,726, filed Mar. 31, 2000, Hamann et al.
Pohl et al.; Optical stethoscopy; Image recording with resolution; 1984 American Insitiute of Physics; Apr. 1984; pp. 651-653; Appl. Phys. Lett. 44 (7)ibm Zurick Research Laboratory, Ruschlikon, Switzerland.

(Continued)

*Primary Examiner* — Kiho Kim
(74) *Attorney, Agent, or Firm* — Jeffrey N. Giunta; Fleit Gibbons Gutman Bongini & Bianco PL

(57) ABSTRACT

A high resolution material observation system includes an object having at least one spatial dimension sufficient to support production of near-field infrared emissions, a holder adapted to receive a sample to be observed, the holder further adapted to position the sample in the near-field infrared emissions, and a thermal excitation unit, adapted to be thermally coupled to at least one of the object and the sample. The thermal excitation unit is further adapted to causing black body radiation in either the object or the sample within the infrared spectrum.

15 Claims, 12 Drawing Sheets

OTHER PUBLICATIONS

Lewis et al.; Develoment of a 500 A Spatial Resolution Light Microscope; Ultramicroscopy 13; 1984; pp. 227-232; North-Holland, Amsterdam.

Xu et al; Heat Transfer Between Two Metallic Surfaces at Small Distances; Journal of Applied Physics 76(11), Dec. 1, 1994; pp. 7209-7216;0021-8979/94/76(11)/7209/8; American Institute of Physics.

Shchegrov et al.; Near-Field Spectral Effects due to Electromagnetic Surface Excitations; Physical Review Letters; Aug. 14, 2000; pp. 1548-1551; vol. 85 No. 7; 0031-9007/00/85(7)1548(4); The Physical Society.

Ingvarsson et al.; Enhanced Thermal Emission From Individual Antenna-Like Nanoheaters; Optics Express; Sep. 3, 2007; 6 pgs.; vol. 15 No. 18; OSA 2007.

* cited by examiner

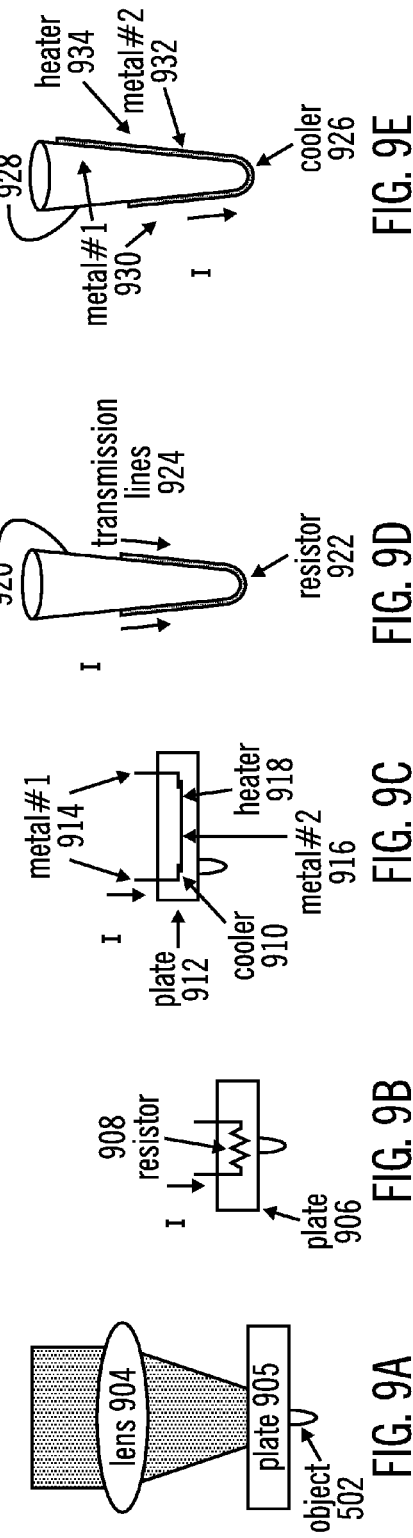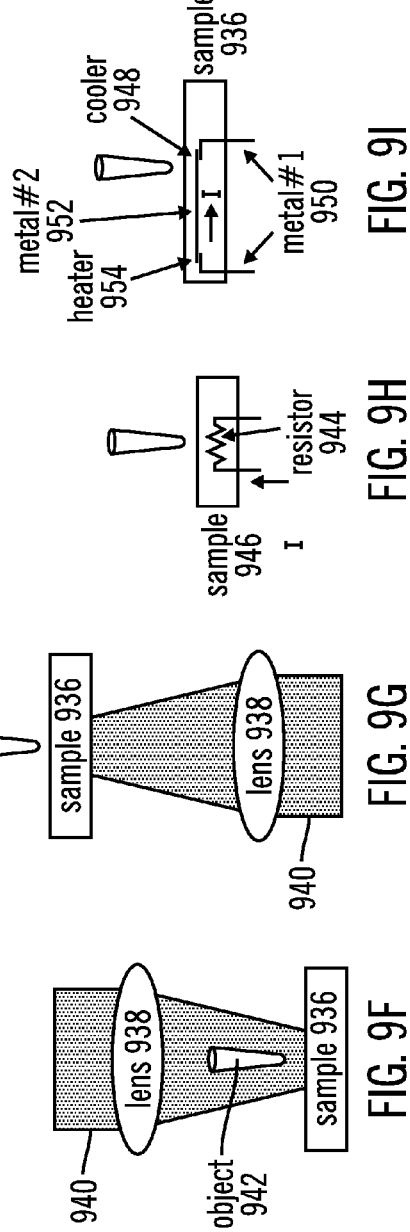

THERMALLY EXCITED NEAR-FIELD SOURCE

CROSS-REFERENCE TO RELATED APPLICATIONS

This application is based on and claims priority from U.S. patent application Ser. No. 11/519,393 filed on Sep. 12, 2006, now U.S. Pat. No. 8,160,223 the entire disclosure of which is hereby incorporated by reference in its entirety.

FIELD OF THE INVENTION

The present invention relates generally to near-field light sources, and, in particular, to near-field light sources generated by nanoheaters.

BACKGROUND OF THE INVENTION

Many applications depend on the ability to read or sense information at very high resolution. For example, in a storage system, such as a CD (compact disc) reader, a focused laser beam is used to read information patterns on a disc. However, since such conventional optics is based on refraction and focusing of electromagnetic radiation, it comes with a fundamental constraint in spatial resolution. Specifically, the propagation of electromagnetic radiation over distances larger than the optical wavelength ($\lambda$) acts as a filter of finite spatial bandwidth, which results in the familiar diffraction limited resolution of $\approx \lambda/2$. For example, for $\lambda=1$ µm, the maximum possible spatial resolution is $\approx 0.5$ µm, which is far from adequate in many now-known and future applications.

As a solution to this resolution problem, near-field techniques have recently been introduced by utilizing non-propagating "near-fields" (D. W. Pohl et al., Appl. Phys. Lett. 44, 651 (1984); A. Lewis et al., Ultramicroscopy 13, 227 (1984)). Due to the lack of propagation, such fields do not obey the diffraction limit (M. A. Paesler, P. J. Moyer, *Near-field Optics* (John Wiley & Sons, New York, 1996)). Generally speaking, in order to generate such near-fields, (i) an incident driving field with the wavelength $\lambda_i$ and (ii) an object (e.g., a sub-wavelength aperture, a sharp object tip, or a sharp edge) with much higher (spatial) wavelengths $\lambda_o$ ($\lambda_o<<\lambda_i$) is needed. Such an arrangement will be referred to herein as a "near-field source," which can "focus" or "concentrate" electromagnetic radiation far below the diffraction limit. This near-field source can then be used to excite another object (typically a sample), which will be referred to herein as a "near-field receiver." The response of the near-field receiver, due to the excitation of the near-field source, results in the generation of propagating waves (e.g., due to scattering, absorption, extinction, fluorescence, chemilumninescence etc.), which can then be monitored in the far-field by some conventional detector setup.

FIGS. 1-3, in conjunction with the following explanation, give examples of how such near-field sources have been realized. Referring first to FIG. 1, most near-field sources utilize a subwavelength aperture 100, which is placed in a propagating wave 102. In most cases, the propagating wave 102 is a focused laser beam (e.g., as is shown in U.S. Pat. No. 4,604, 520). In this example, a small fraction of the incoming field 102 is converted into a non-propagating near-field 104, which "leaks" out of the aperture 100 and can be used to excite a sample/work piece (not shown).

In an alternative approach, as shown in FIG. 2, which can offer substantially higher resolution and stronger near-fields, a sharp object tip 200 is driven externally by an electromagnetic laser field 202 in order to generate a highly localized near-field source 204 (e.g., U.S. Pat. No. 4,947,034). In some cases, antenna effects are exploited to further enhance the strength of the near-field (e.g., U.S. Pat. No. 6,771,445; see also "Strength of the electric field in apertureless near-field microscopy" Y. C. Martin, H. F. Hamann, H. K. Wickramasinghe, J. Appl. Phys. 89, 5774 (2001))

As a third example, FIG. 3 shows a driving field 302 that is reflected via internal reflection at a surface 304 of a prism 300 (e.g., as is shown in U.S. Pat. No. 5,018,865). On the outside of the prism 300, due to the abrupt change at the prism-air interface 304, a "one-dimensional" electromagnetic near-field 306 is generated, which decays exponentially away from the surface 304, but which is still diffraction limited in the lateral dimensions.

Unfortunately, the arrangements of FIGS. 1-3 in addition to generating a localized non-propagating near-field, also scatter some of the driving field into the far-field. As a result, some fraction of the driving field directly hits the detector. Such signals are referred to as "background" and are shown as elements 106, 206, and 308 in FIGS. 1-3, respectively.

The usefulness or quality of a near-field source is largely determined by the ratio of near-field versus far-field (background) signal strengths. All traditionally-used near-field sources (FIGS. 1-3) for reading information have in common that the driving field is generated by a laser or other light source. As a result, the various methods for generating near-fields are accompanied by several difficulties and challenges. Some of the near-field sources show low near-field strengths (FIG. 1) and low confinement (FIGS. 2 and 3). Others, such as that shown in FIG. 2, although providing strong near-fields and very high confinement, can generate fairly large propagating background signals at the same wavelength as the near field energy due to the driving field 202, which can somewhat obscure the response of the near-field receiver. In addition, the strength of near-field of these configurations is very sensitive to the polarization, the wavelengths, and the focus of the driving field, which further complicates the control of such near-field sources.

Therefore a need exists to overcome the problems with the prior art as discussed above.

SUMMARY OF THE INVENTION

The present invention provides a high resolution material observation system that includes an object having at least one spatial dimension sufficient to support production of near-field infrared emissions, a holder adapted to receive a sample to be observed, the holder further adapted to position the sample in the near-field infrared emissions, and a thermal excitation unit, adapted to be thermally coupled to at least one of the object and the sample, the thermal excitation unit being further adapted to causing black body radiation in the at least one of the object and the sample within the infrared spectrum.

In accordance with another feature, the invention also includes a controller for positioning the object relative to the sample.

In accordance with a further feature, the invention includes a detector operable to measure a far-field response produced by an interaction of the object and the sample in the near-field infrared emission.

In accordance with yet another feature, the present invention includes a detector operable to measure a near-field response produced by an interaction of the object and the sample in the near-field infrared emission.

In accordance with other features of the present invention, the detector is a near-field microscope which measures the near-field infrared emission.

In accordance with a further feature of the present invention, the object and the thermal excitation unit comprise a resistive heater with a first dimension substantially equal to one half of a wavelength of the near-field infrared emission and a second dimension much less than the wavelength of the near-field infrared emission, where the first dimension is perpendicular to the second dimension.

In accordance with one added feature of the present invention, the resistive heater includes a first plate and a second plate, where the plates each have an edge that is perpendicular to the first dimension and larger than the second dimension.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 9A-9I illustrate various near-field sources using thermal excitation or cooling in accordance with an embodiments of the present invention.

DETAILED DESCRIPTION

Figure 1:
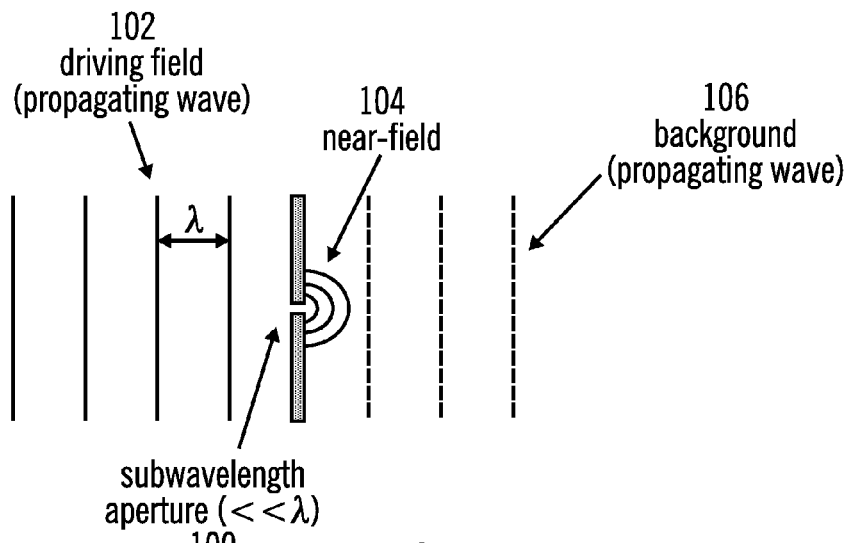
FIGS. 1-3 illustrate prior art near-field sources.

While the specification concludes with claims defining the features of the invention that are regarded as novel, it is believed that the invention will be better understood from a consideration of the following description in conjunction with the drawing figures, in which like reference numerals are carried forward.

Described now is an exemplary apparatus and method for driving and utilizing a near-field source for reading information at a sub-wavelength resolution. The present invention circumvents several problems associated with the prior-art methods of laser excitation, is simpler and significantly less expensive. Specifically, embodiments of the present invention excite a near field electromagnetic source thermally, which is realized in an embodiment by a temperature difference between source, receiver, and detector. The near field source has at least one dimension that is much smaller than the wavelength of the emitted light. The result is a strong and almost background free near-field source, which can then be used for applications such as reading and/or sensing information at a very high resolution that is far below the diffraction limit.

Figure 4:
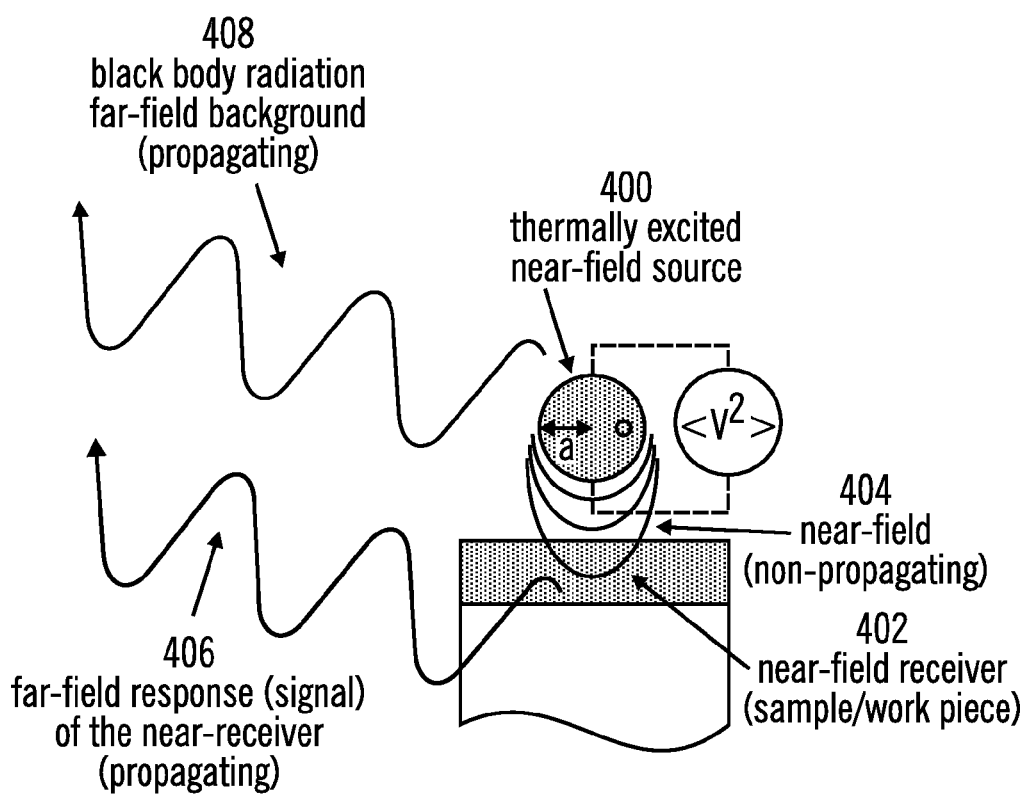
FIG. 4 illustrates a near-field source and sample arrangement in accordance with an embodiment of the present invention.

Referring now to FIG. 4, an embodiment of the present invention is shown. A sphere 400 represents a thermally excited near-field source, which has a temperature that is higher than the temperature of a sample 402. It should be noted that in this particular example, any near-fields generated in the sample 402 itself are ignored. Thus, the sample 402 is considered a "pure" near-field receiver. In general, the averaged squared voltage of a resistor due to thermal excitation is given by the Nyquist theorem $<V^2>=\sqrt{4kTR\Delta f}$, where k is the Boltzmann constant, T the temperature, R the resistance, and $\Delta f$ the bandwidth. For the embodiment of FIG. 4, the resistance of the sphere 400 with a radius "a" is approximated by $R \approx \sigma/a$, where $\sigma$ is the resistivity of the sphere 400. The bandwidth $\Delta f$ depends on the temperature of the sphere with $\Delta f=kT/h$, where h is Planck's constant. The averaged square amplitude of the resulting internal driving field of the sphere can then be approximated by $<E_o^2> \approx k^2 T^2 \sigma/ha^3$. As an example, a T=1000 K hot sphere with a=10 nm and a resistivity of $\sigma=10^{-5}$ $\Omega$m corresponds roughly to an optical driving field of 10 mW focused to a spot radius of 0.5 μm (@ 633 nm).

Figure 2:
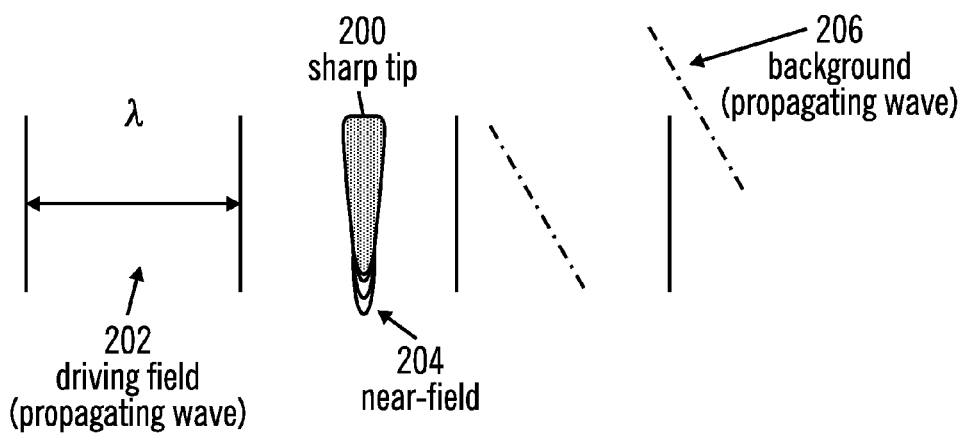
Figure 3:
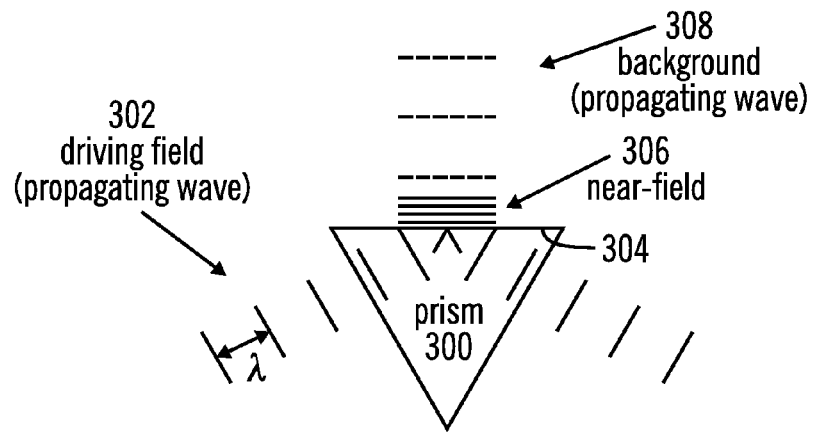

As in the case of a laser excitation, the thermally generated driving field ($<E_o^2>$) will result into a strong localized near-field 404. This near-field source can then be used to excite a near-field receiver 402 (e.g., sample or work piece). The sample 402 generates—due to the excitation by the near-field source—propagating waves 406. The propagating waves 406 (i.e., signal) can then be detected in the far-field. As a comparison, if the sphere 400 were instead heated by the prior-art method of laser excitation, the sphere 400 would radiate additional propagating far-field waves 408 as a background. However, in contrast to the laser excitation of conventional systems, one embodiment the present invention provides the advantage that thermal excitation can be applied locally to the near-field source, which significantly helps to reduce background signals. In fact, the only background signal caused by the thermal excitation is the resulting black body far-field radiation, which can be many orders (>4) of magnitude weaker than the thermal near-field components. Such a high ratio between near-field and far-field (background) strength can not be obtained easily by any of the prior art arrangements shown in FIGS. 1-3. In addition, experiments show that the resolution of these thermally excited near-field sources is very high—in fact much higher than what can be obtained by the exemplary prior-art arrangements shown in FIGS. 1 and 3.

In summary, the present invention exploits temperature differences between a source and a receiver, which results in an almost background free, easy to use, and low-cost near-field apparatus for reading information at very high resolution. In some embodiments of the present invention, the thermally-generated driving field consists of several frequencies (i.e., from DC to kT/h) and, therefore, the resulting near-field component may involve several frequency components as well. In these embodiments, surface waves and/or shape resonances in the near-field source object can be exploited to select a few frequencies, which can result in a near-field source that emits near field energy with defined wavelength bands or that are monochromatic. In addition, the temperature of the near-field source may be used to adjust or tune the frequencies of the thermally generated near-field source if necessary or desired.

Figure 5:
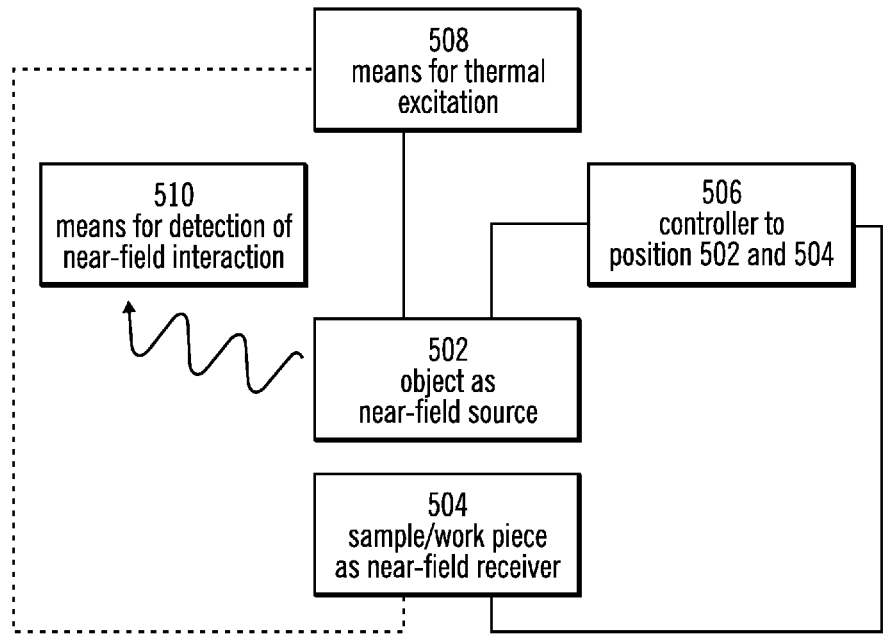
FIG. 5 is a block diagram of a near-field object, sample, and detection arrangement, where the object is used as the near-field source in accordance with an embodiment of the present invention.

FIG. 5 is a block diagram illustrating one embodiment of the present invention. The invention, which is used to detect information at subwavelength resolution, includes an object 502, such as an object, with a temperature $T_{502}$, a sample or work piece 504 with a temperature $T_{504}$, a controller 506, which positions the source 502 relative to the sample 504, means 508 to excite or drive the source 502 and/or sample 504 thermally (i.e., means to generate a temperature difference between object/sample/detector) and also means 510 to detect the near-field interaction response including a detector with a temperature $T_{510}$.

Figure 6:
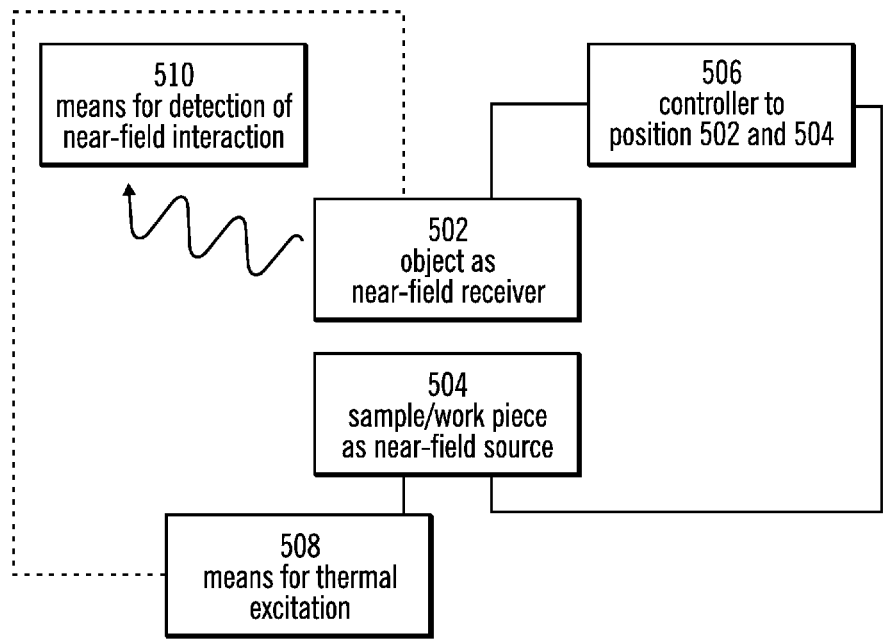
FIG. 6 is a block diagram of a near-field object, sample, and detection arrangement, where the sample is used as the near-field source in accordance with an embodiment of the present invention.
Figure 7:
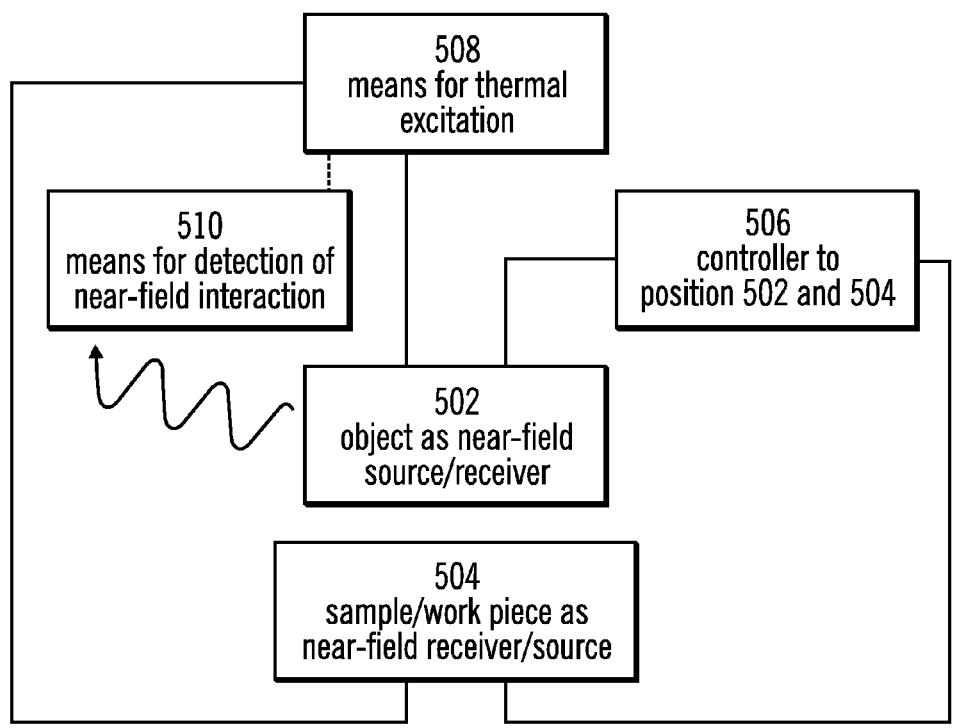
FIG. 7 is a block diagram of a near-field object, sample, and detection arrangement, where the object and the sample are both used is used as near-field source and as a near-field receiver in accordance with an embodiment of the present invention.

In this embodiment, the object 502 acts as the near-field source and the sample/work piece 504 acts as the near-field receiver. In this case, the temperature of the object 502 is higher than the temperature of the sample ($T_{502}>T_{504}$). In other embodiments, as shown in FIG. 6, for instance, the sample/work piece 504 is the near-field source and the object 502 is the near-field receiver. In this alternative embodiment, the sample 504 temperature is higher than the object 502 temperature ($T_{504}>T_{502}$). In yet another embodiment of the present invention, as shown in FIG. 7, the sample/work piece 504 as well as the object 502 act as a near-field source and receiver at the same time. In this case, both the object 502 and sample 504 are roughly the same temperature and the detector 510 is at lower temperature than object 502 and/or sample 504 ($T_{502}\approx T_{504}$; $T_{502}<T_{510}$). In the following sections, the different components of the invention are discussed more in detail.

The Object

Except as discussed below, the object 502 is not restricted to any particular shape or dimensions and can be made of any material. However, the following considerations can be used as a guideline in selecting an object 502.

(i) Generally, if the object is used as a near-field source, the strength of the thermally excited near-field should be enhanced.

(ii) If the object is used as a near-field source, in some applications, it is desirable to select certain frequencies for the near-field spectrum (iii) If the object is used as a near-field receiver, it is preferred to optimize the efficiency, with which the object can convert the near-field energy into propagating waves.

(iv) Regardless of whether the object is used as a near-field receiver or source, the dimensions of the object should be chosen to match the target resolution of the apparatus.

(v) For some applications, it may be more advantageous to integrate a local heater or cooler and/or sensor, such as thermocouple, into the object, which helps to control the tip end temperature more accurately and can be used as an additional readout signal. In such situations, the design is more constrained and typically largely determined by the heater/cooler/sensor requirements. Such objects are discussed in detail below.

Figure 8A:
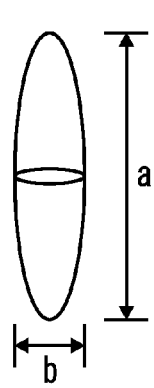
FIGS. 8A-8G illustrate various embodiments of objects suitable for use as a near field source or receiver in accordance with embodiments of the present invention.
Figure 8B:
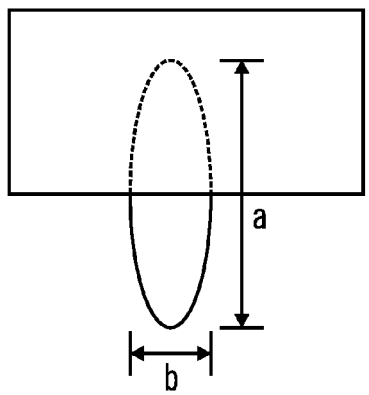
Figure 8C:
Figure 8D:
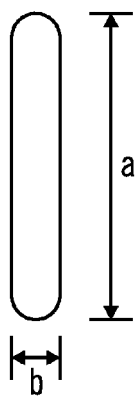
Figure 8E:
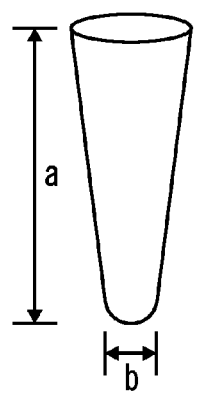
Figure 8F:
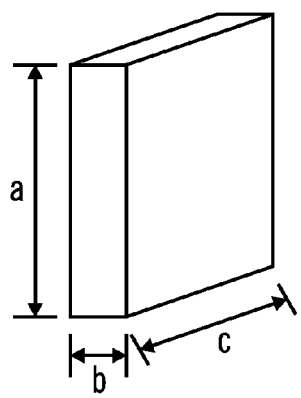
Figure 8G:
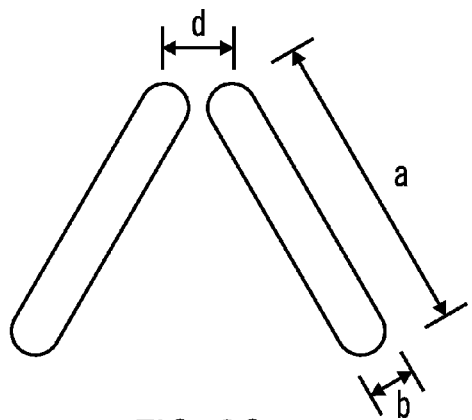

More specifically, and with reference to FIGS. 8A-G, in terms of geometry, very often elongated shapes with high major axis/minor axis ratios are preferred. This includes ellipsoids/spheroids (FIG. 8A), semi-ellipsoids/spheroids attached to a plate (FIG. 8B), cylinders/rods (FIG. 8C), cylinders/rods with rounded or pointed ends (FIG. 8D), pointed or rounded triangular/pyramidal shapes (FIG. 8E), rectangular geometries (FIG. 8F) or any kind of combinations of more than one of the object shapes (FIG. 8G). These geometries can enhance the strength of the near-field due to antenna-like behavior. Furthermore, the pointed object acts as an additional concentrator of the emitted near-field energy, which boosts the sensitivity as well as the resolution of the apparatus. As an additional advantage, theses structures can also show large efficiencies to convert near-fields into propagating fields. Finally, some elongated objects can be designed to enhance and tune resonance in the object. These effects can then be exploited to engineer objects with an almost monochromatic near-field spectrum ranging from deep IR to near IR.

With regard to the dimensions, generally the object 502 or the object end (b) is significantly smaller than the sample 504, because the object 502 determines the resolution. In most cases, the object width (b) is significantly smaller than the wavelengths involved. For example, at T=1000 K the peak wavelength in the black body radiation is 2.3 μm (Wien's displacement law), whereas the (nominal) radius or the size of object (b) is typically in the 10 nm range. If the near-field source 502 generates a narrow window of wavelengths (λ) (e.g., by resonance in the near-field source), then it is advantageous to adjust the dimensions of the object to these wavelengths. For example, if the near-field object source contains mostly wavelengths of $\approx\lambda$, one can adjust length (a) of the object to a$\approx\lambda/2$ and select the width (b) (and c in FIG. 8F) to be as small as possible in order to most efficiently exploit antenna resonance effects. Finally, if several objects are involved to generate a stronger thermally generated near-fields (see FIG. 8G), the preferred distance (d) between them is as small as possible (d<b).

In terms of the materials, there may be very different preferences depending on whether the object 502 is used as a receiver or near-field source (see FIG. 5 vs. FIG. 6). In the embodiment where the object is the near-field source (FIG. 5), a highly resistive, but still conducting material (e.g., carbon, thin metal films, Si) may be chosen, because, according to the Nyquist theorem, the higher resistance causes a stronger driving field ($<E_o^2>$) for a given temperature. In addition, if the near-field source 502 is heated to a high temperature, a higher melting temperature material is preferred. Furthermore, a strong positive temperature dependence of the resistivity may be advantageous (i.e., the resistivity increases with increasing temperature), which enhances the strength of the driving field at elevated temperatures. Finally, if the near-field source 502 should provide certain frequencies (e.g, for localized IR microscopy and spectroscopy), materials that allow the appropriate resonance are preferred. For example, all the III-V and II-VI semiconductors show a sharp surface wave resonance in the mid infrared band (as described by A. V. Shechegrov et al., Phys. Rev. Lett. 85, 1548 (2000)), which can be used to enhance certain frequencies. In case the object is utilized as a near-field receiver, materials are preferred which show large scattering efficiencies (e.g. Au, Al) in the appropriate wavelength range. In some cases, materials with a resonance may be exploited to enhance the scattering efficiency.

Sample/Work Piece

The sample or work piece 504 is not limited to any particular material or any dimension or shape. The sample 504 may include information patterns consisting of topographic (e.g. little protrusions), optical (e.g. little islands of a differing materials with differing optical indices) or even magnetic features. In terms of the sample shape, it is advantageous that the sample is overall flat so that it can be read faster. In general, for an optimum reading, one may want to match the sample features to the object dimensions. If the object is used as a near-field receiver and the sample as the near-field source, it may be preferred to have little protrusions on the sample as the information pattern. This will enhance the strength of the near-field and therefore the sensitivity/speed of the apparatus. If the sample 504 is heated, then, naturally, a higher melting temperature for the sample is required.

Controller

As shown in FIGS. 5-7, the present invention includes a controller 506 to position one or both of the object 502 and the sample 504 with respect to each other. In some embodiments, the controller 506 includes a sensor, which monitors the position of the object relative to the sample. This sensor is often used to produce an error signal for a feedback loop, which controls a positioning device (e.g. a piezo electric actuator) to match a desired position. More specifically, the object 502 could be a replacement for an atomic force microscope (AFM) or scanning tunneling microscope (STM) tip and the positioning is realized with conventional AFM or S™ feedback techniques. In other arrangements, and in analogy to magnetic storage technology, this controller 506 includes an air bearing mechanism in combination with additional sensors and electronics for lateral positioning of the object 502.

Means for Thermal Excitation

The near-field source (i.e., object 502 in FIG. 5, sample 504 in FIG. 6, or object 502 and sample 504 in FIG. 7) is thermally excited in one embodiment of the present invention. Generally, this is realized by a temperature difference between the source and receiver and/or detector. For example, in FIG. 5, the object 502 can be heated relative to the sample 504 and/or the sample 504 can be cooled relative to the object 502. In FIG. 6, the object 502 can be cooled relative to the sample 504 and/or the sample 504 can be heated relative to the object 502. In FIG. 7, object 502 and sample 504 are roughly at the same temperature and the detector 510 is at a lower temperature. Typically, that is accomplished by cooling the detector 510 and/or heating sample 504 and object 502. Various types of heating and cooling schemes can be applied. Heating (relative to the detector temperature) is preferably applied to the smallest possible area, which helps to reduce background far-field radiation. On the other hand, in case of cooling (relative to the detector temperature) a larger cooled area may be advantageous because it will minimize background contributions due to the black body radiation.

More specifically, FIGS. 9A-I show possible examples of configurations that can be used for heating and/or cooling the sample 504 or object 502. In FIG. 9A, a laser 902 is focused via a lens 904 on a plate 906 to which the object 502 is attached. The absorbed laser light will heat the plate 906 and therefore the attached object 502, which then can act as a near-field source. The plate 906 can be the cantilever of an atomic force microscope object. In these embodiments, the laser 902 is able to be selected to have a wavelength remote from the near-field radiation being generated by the heated source.

In FIG. 9B the plate 906 is heated with current I supplied to a resistor 908 which is attached to the plate 906.

FIG. 9C shows a cooling scheme, where the cooled junction 910 of a Peltier element is attached to the plate 912. The Peltier element includes two different metal stripes 914, 916 connected to a current source I. The hot junction 918 of the Peltier element is further away from the object and thus does not influence the object temperature significantly.

FIG. 9D illustrates how an object 920 can be heated very locally by mounting a resistor 922 to its end, which is connected via transmission lines 924 to a current source I.

FIG. 9E illustrates a cooled junction 926 of a Peltier element directly mounted to the end of the object 928. In comparison to FIG. 9D, the heater of FIG. 9E is made from two different metallic strips 930, 932 through which current I is passed. The hot junction 934 is arranged to be further away from the object and therefore does not influence the cooling.

In FIGS. 9F and 9G, the sample 936 is heated via a laser beam 940, which is focused with a lens 938 onto the work piece 936. FIG. 9F illustrates a geometry where the laser beam 940 is incident from the same side as the object 942, while in FIG. 9G, the laser is brought in from the opposite side. FIG. 9H illustrates a resistor 944 attached to the sample 946 which is heated by supplying a current I. The laser beam 940 is used in these embodiments to thermally excite near field sources and is selected to have a wavelength remote from the wavelength of the near-field energy of interest being generated by the sources.

Finally, FIG. 9I illustrates the sample 936 cooled with cold junction 948 of a two metal strip 950, 952 Peltier element, through which current I is passed. Again in analogy with previous cases the corresponding hot junction 954 is arranged far away from the object in order to achieve effective cooling.

Nanoheater

Figure 10:
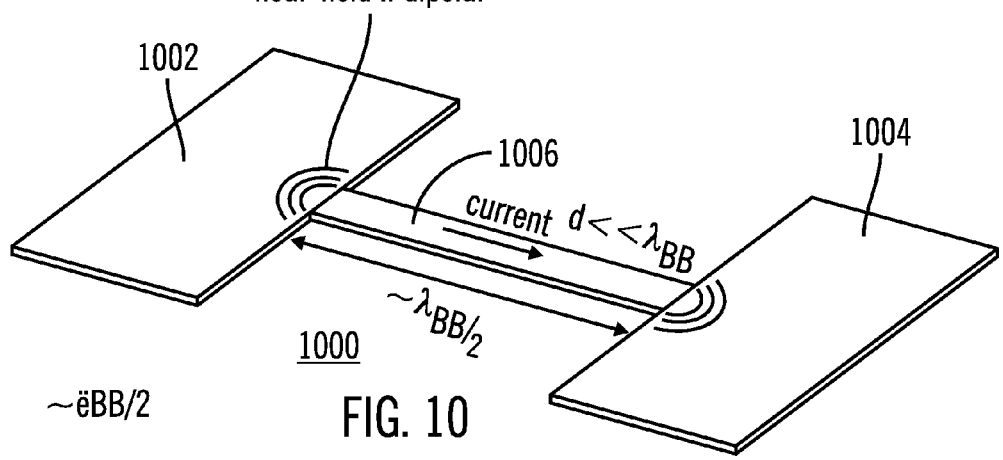
FIG. 10 is a side-elevational view of a nanoheater (infrared light source) in accordance with an embodiment of the present invention.

FIG. 10 shows an infrared (IR) light source 1000, referred to herein as a "nanoheater", according to an embodiment of the present invention, which can be used for generating IR near-field radiation. The nanoheater 1000 includes two electrodes 1002 and 1004 connected by a thin strip of conductive material 1006 forming a nanoheater. 1006 can be heated using Joule heating by applying a current I. The heating creates charge fluctuations, which are illustrated in FIG. 10. The geometric dimensions of the nanoheater 1000 are such that the length of the strip 1006, and thus the separation of the plates 1002 and 1004, is about half of a wavelength of black body (BB) radiation, i.e. $\sim \lambda_{BB}/2$. BB radiation is the radiation emitted from a sample. The width d of the strip 1006 is much less than a wave length of the BB radiation, i.e. $d<<\lambda_{BB}$. The small width of the strip 1006 causes the strip 1006 of the nanoheater to radiate concentrated near-field energy, and the length of the strip 1006 causes this near-field energy to have a wavelength in the vicinity of $\lambda_{BB}$.

Figure 11:
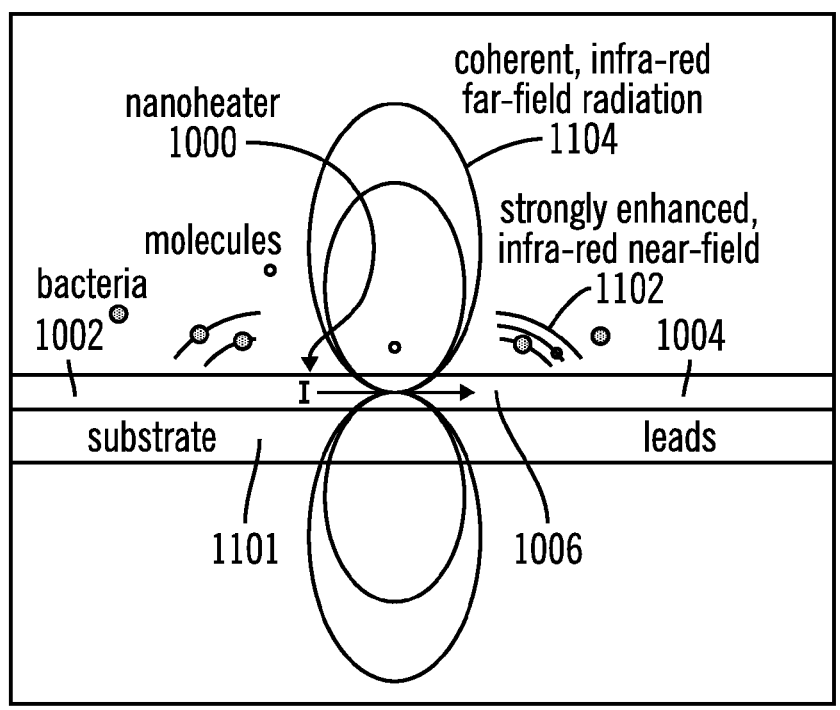
FIG. 11 is a side view of the nanoheater of FIG. 10 including electromagnetic radiation patterns, in accordance with an embodiment of the present invention.

FIG. 11 shows a side view of the nanoheater 1000 resting on a substrate material 1101. A current I flows from one electrode 1002 to the other 1004, thereby creating a coherent infra-red far-field radiation 1104 and a strongly enhanced infra-red near-field radiation 1102. The FIG. 11 illustrates how the near-field of the nanoheater can be used to detect some molecules in the close vicinity of the nanoheater. It also illustrates how the coherent, antenna-like far-field emission of the nanoheater.

The nanoheater 1000 is a very small and strong coherent IR light source. It exploits geometrical, plasmonic, and antenna-like resonances to confine thermally-activated charge fluctuations. Through use of the nanoheater 1000, the IR emissions can now be characterized as a function of heater material, geometry, temperature, and others (i.e., degree of coherence, spectrum, far-field, and near-field intensity). A nanoheater 1000, in accordance with one embodiment of the present invention, has an energy range of 0.15-0.3 eV (4-9 μm). The spatial resolution ranges from diffraction limits in the far-field to about 0.1 microns in the near-field. In addition, the intensity is greater than 100 times conventional in the far-field and over 1000 times conventional in the near-field (similar to IR synchrotron).

As was discussed with reference to FIG. 4, radiation 406 is generated through the excitation of the near-field receiver 402 by the near-field source 400 and is detected in the far-field. This radiation can be the result of any response of the sample due to the object including scattering, absorption, extinction, fluorescence and chemiluminescence. A detection arrangement, in accordance with one embodiment of the present invention typically includes: (i) an appropriate optical system (e.g., lenses, minors, gratings, beamsplitters etc.), which guides the radiation and (ii) a suitable detector, which turns the radiative power into a current or voltage. In principle, the detection can be realized in various ways, typically classified in two groups: a transmission (see for example FIGS. 12 and 13) or a reflection (see FIG. 14) geometry. In general, a variety of optical components can be used. However, since the wavelength range of the near-field source extends typically from near infrared (1 μm) to deep infrared (10 μm), infrared suitable optical components are preferred including reflective (e.g., parabolic, elliptic objectives made out of Au or Al, for instance) and transmissive optics (e.g., lenses made out of $BaF_2$, $CaF_2$, and others). Several types of detectors can be used including IR-sensitive photoconductive (e.g., PbSe, HgCdTe), or photovoltaic (e.g., InSb) detectors as well as "heat" detectors such as pyroelectric devices or thermocouples. It may be preferred to cool the detectors to reduce noise and enhance the sensitivity. For spectroscopic applications the detection system may include a suitable spectrometer (grating or prism), which can disperse the different wavelengths scattered by the object and/or sample. In general, detection systems used by various IR imaging and/or observation systems are able to be effectively incorporated into one embodiment of the present invention.

Figure 12:
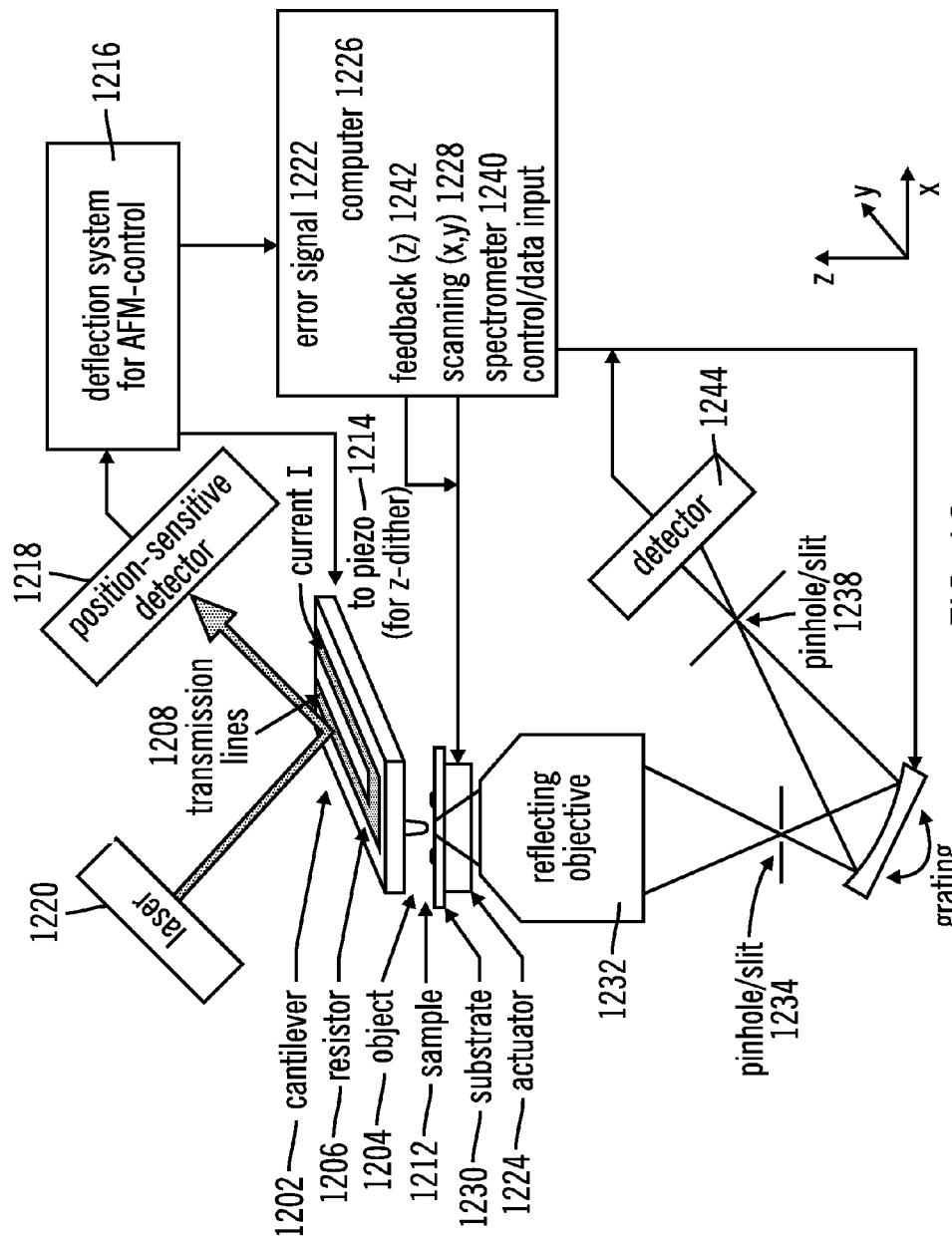
FIG. 12 is a diagrammatic view of a near-field microscope which utilizes near-field IR radiation from a tip of an object to realize spectroscopy and microscopy at very high resolution in accordance with an embodiment of the present invention.
Figure 13:
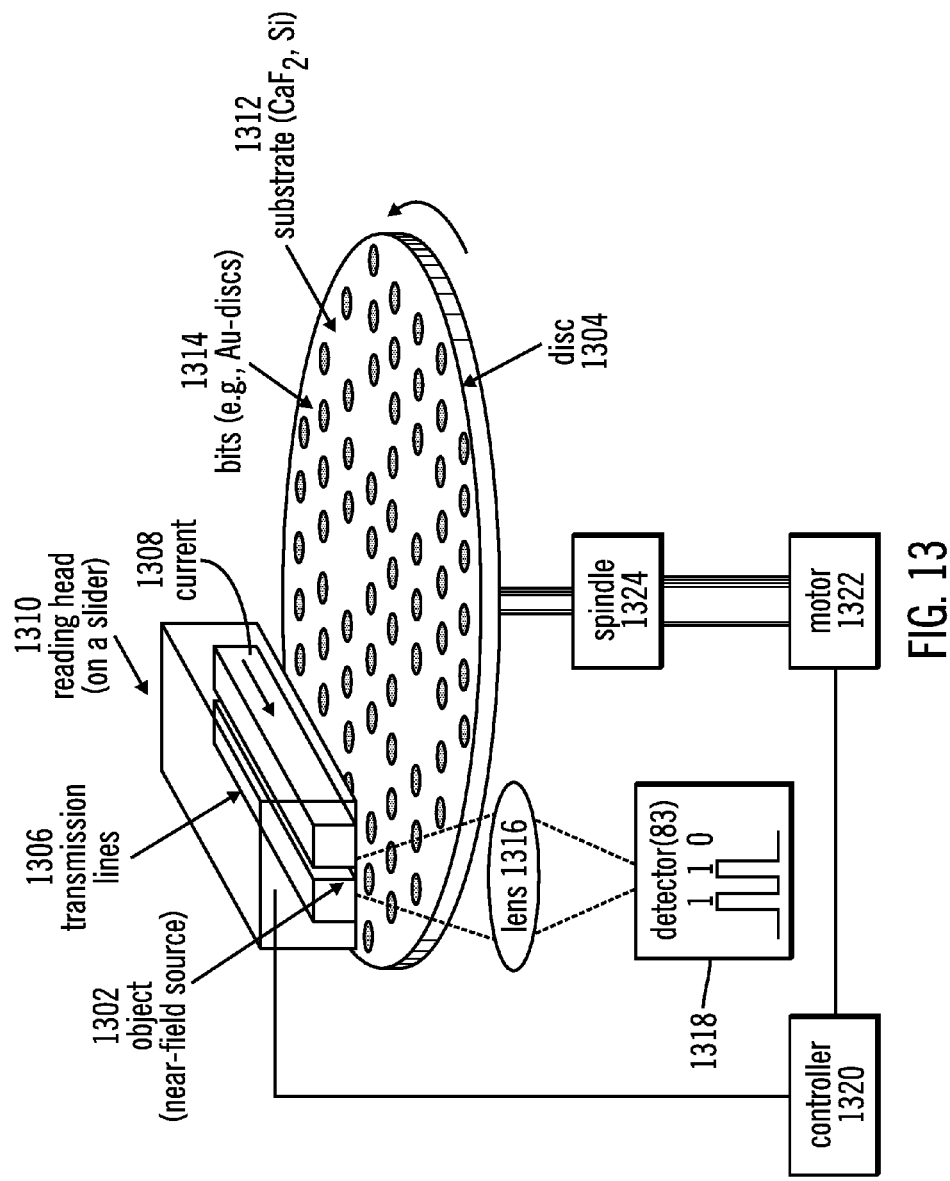
FIG. 13 is a diagrammatic view of a heated object used as a near-field source to read an information pattern on a rotating disc, in accordance with an embodiment of the present invention.
Figure 14:
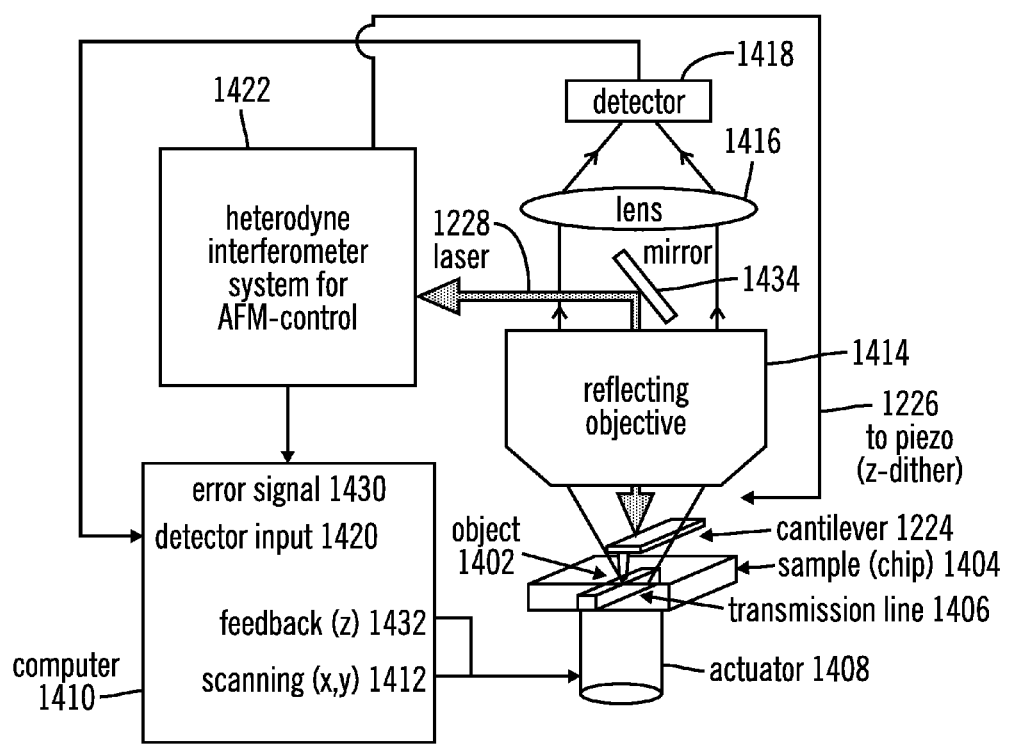
FIG. 14 is a diagrammatic view of an imaging system using an object as a near-field IR receiver and a sample as a near-field IR source, in accordance with an embodiment of the present invention.

FIGS. 12-14 illustrate three embodiments of the present invention. FIG. 12 shows a near-field microscope which exploits the near-field IR radiation generated by an object 1204 to realize spectroscopy and microscopy at very high resolution. Specifically, the cantilever 1202 is a source holder that holds an object 1204 and that is heated by a resistor 1206, which is connected via transmission lines 1208 to a current supply I. The object 1204 attached to the heated cantilever 1202 is held by a feedback control 1242 over the sample 1212 surface. Specifically, the cantilever 1202 is vibrated with a piezoelectric actuator 1214, typically at one of its resonances. The vibration is monitored by a deflection system (1216 and 1218). A laser 1220 (e.g., laser diode) is focused on the back of the cantilever 1202 and its reflection is picked up by a position sensitive detector 1218 (e.g., split Si-photodiode) to monitor the motion of the cantilever 1202 and therefore the source object 1204. The vibration amplitude is measured with an electronic system 1216 (e.g., lock in amplifier). Its magnitude (error signal 1222) is compared to a set point, which controls the z-position 1224 of the sample 1212 with respect to the object by an actuator 1224. Actuator 1224 of this embodiment is a holder that is adapted to receive the sample 1212 and position the sample 1212 in the near-field infrared emissions produced due to the geometry of the object 1204.

It is noted that there are other alternatives for the above described AFM-feedback control including the measurement of the frequency of the vibration (FM-technique). In the example of FIG. 12, the feedback is realized digitally using a computer 1226, which also controls the scanning (x,y position 1228). The near-field of the heated object is used to excite the sample 1212 (e.g., molecules, etc. being observed), which is arranged on a substrate 1230 with high transmissivity in the IR band (e.g., Si). The radiative response of the sample due to the excitation by the near-field source is picked by a high numerical aperture reflecting objective 1232. The signal is imaged onto a pinhole or slit 1234, then reflected by a grating 1236 of an IR-spectrometer 1240, refocused onto another pinhole or slit 1238 and finally measured by detector 1244.

The grating 1236 position can be tuned by a computer, which allows for realization of wavelength resolved microscopy at high resolution. In cases, where the signal strength is fairly low, it may be preferred to measure the signal in AC by a lockin amplifier at the vibration amplitude of the cantilever. In order to measure the total signal one could remove the grating 1236 and/or the slits/pinholes 1234, 1238.

FIG. 13 shows another embodiment, where a heated object is used as a near-field source 1302 to read an information pattern on a rotating disc 1304. In this example, the object 1302 includes a small resistor sandwiched by two larger transmission lines 1306, which are connected to a current supply 1308. The heated object 1302 is integrated into a slider as a reading head 1310. This reading head 1310 flies via an air-bearing surface over the disc at a very close distance. As an example, the disc substrate 1312 can be a high transmissive material such as $CaF_2$ and Si, while the bits 1314 are made out of a high reflecting and/or absorbing material (e.g., Au). The resulting radiation is picked up with a lens 1316 and imaged onto a detector 1318. In order to achieve reading speeds of >100 MHz a shot-noise limited detection of at least 1 μA is required. The lateral position of the reading head 1310 with respect to the disc 1304 is adjusted by a controller 1320, which also controls the motor 1322 and the spindle 1324 for the rotation of the disc 1304.

As a third embodiment, FIG. 14 shows a different application, where the temperature distribution of the sample can be measured at high resolution. In contrast to FIGS. 12 and 13, the object is the near-field receiver 1404 and the sample is the near-field source 1402. As an example, a tiny heated transmission line 1406 within a semiconductor chip is chosen as the sample. If the transmission line dissipates power and consequently heats the chip, the heat generates a near-field in the very close proximity to the surface of the sample (in analogy to FIG. 3). The strength of this near-field represents the local temperature. Because this near-field is very short-ranged in the z-direction, it provides a mean for high spatial resolution imaging. As the AFM-object 1402 is scanned with an actuator 1408 controlled by the computer 1410 laterally (x,y position 1412) it "releases" and radiates the frustrated near-field radiation within the chip and maps out the temperature/heat distribution at the sample at high resolution. This radiation is picked up by a reflecting objective 1414 and imaged with a lens (e.g. Si, 1416) onto a suitable detector 1418 in a reflection geometry. The output of the detector is connected via a detector input 1420 to the computer 1410, which allows construction of a temperature image as a function of object 1402/sample 1414 geometry.

In FIG. 12, a deflection system was used to monitor the cantilever 1202 vibration. However in this embodiment we use a heterodyne interferometer system 1422 and excite the cantilever 1424 with a small piezoelectric actuator at or near one of its resonances 1226. This heterodyne interferometer system may include various optical components/detectors and a laser 1228 as well as a lockin amplifier, which measures the amplitude of the vibration as well as other electronic components. The amplitude is used in a computer 1410 controlled feedback loop as the error voltage 1430 to control the z-position 1432 of the actuator 1408. The heterodyne laser can be brought by a mirror 1434 through the middle of the objective 1414, which is typically hollow.

It should be noted that the setup illustrated in FIG. 14 measures the temperature distribution by mapping the local near-field, which contains many frequencies in its spectrum. In another version of such a microscope, one may prefer (in analogy to FIG. 13) to disperse the wavelengths of the near-field response by a spectrometer. The spectrum can be used not only to determine the local temperature (i.e., Wien's displacement law) in absolute units, but it is also specific to the local optical index of the sample.

Figure 15:
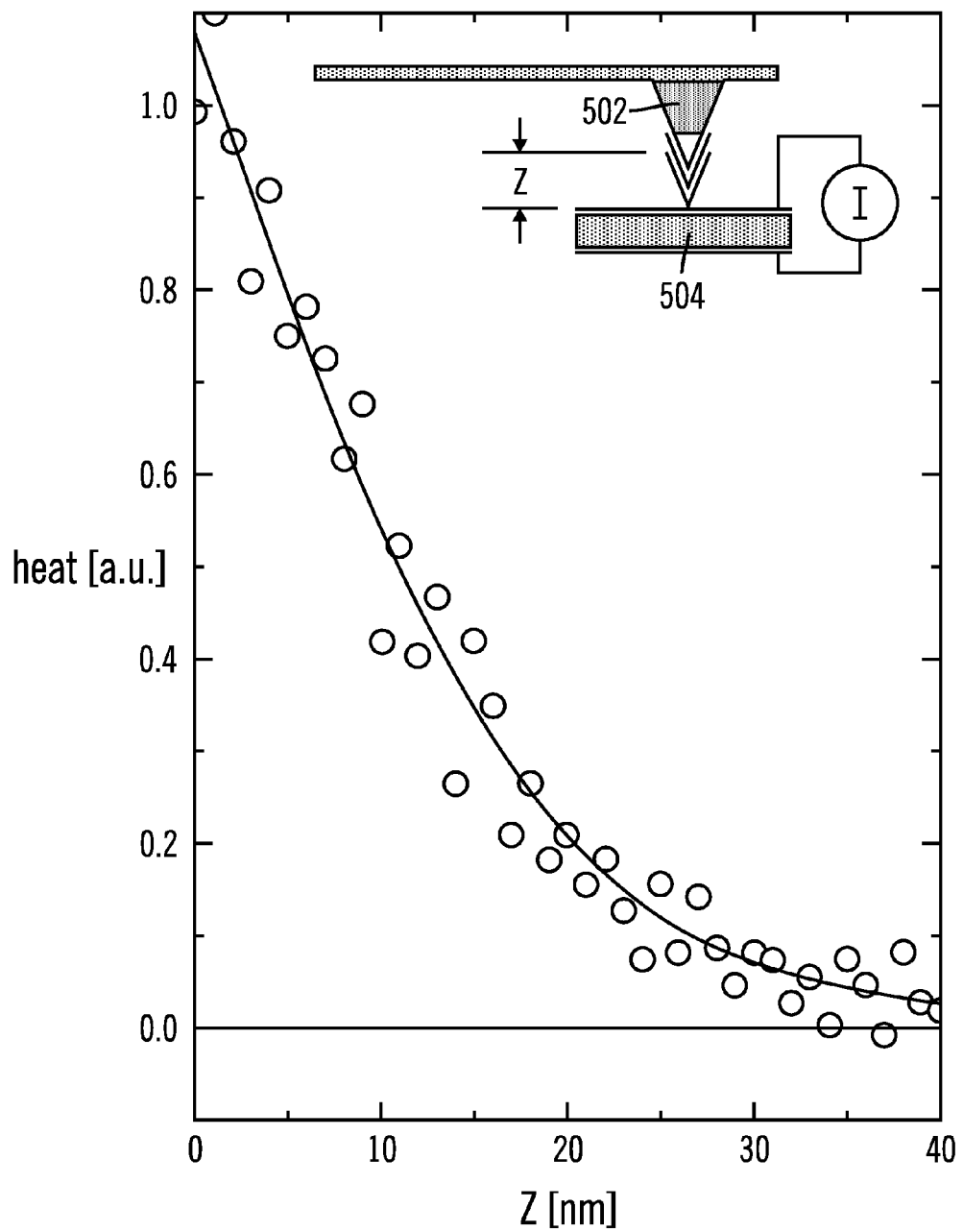
FIG. 15 illustrates an IR power flow vs. distance from a near-field IR source, in accordance with an embodiment of the present invention.

Experimental Data:

The physical concept of the present invention has been proven through use of a heated AFM-object 502 (near-field source) that was approached by a pyroelectric detector 504 (near-field receiver). The transferred total power from the object 502 to the detector 504 was measured as a function of object-sample distance z. FIG. 15 shows some of the data before the object touches the surface (verified by the deflection signal from the AFM-cantilever). It reveals a very strong and very short-ranged power flow when the object/sample are within their near-field regions validating the generation of significant near field IR radiation by a thermally excited source. In fact, the 1/e decay constant is <10 nm, which promises comparable lateral resolution. For a CCD readout system based on this mechanism this lateral resolution would translate to densities up to 1.6 Tbit/in$^2$ assuming a bit spacing of 20 nm The estimated power from the tip to the pyroelectric detector is estimated to be in the μW-range, which is sufficiently strong for many applications.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A high resolution material observation system, comprising:
    an object having at least one spatial dimension sufficient to support production of near-field infrared emissions;
    a holder adapted to receive a sample to be observed,
    wherein one of the object and the sample operates as a near-field infrared source, and wherein one of the object and the sample is a near-field infrared receiver, the near-field infrared receiver being different than the near-field infrared source, and
    wherein the holder is further adapted to position the sample so as to place the near-field infrared receiver in the near-field infrared emissions produced by the near-field infrared source;
    a thermal excitation unit, adapted to be thermally coupled conductively to the near-field infrared source so as to conduct thermal energy to and thermally excite the near-field infrared source, thereby generating a temperature difference between the object and the sample so as to cause black body radiation within the infrared spectrum; and
    a detector operable to measure at least one of a far-field response and a near-field response, the at least one of the far-field response and the near-field response produced by an excitation of the near-field infrared receiver by the near-field infrared emission produced by the near-field infrared source.

2. The high resolution material observation system according to claim 1, further comprising:
    a controller communicatively coupled to the object and the sample, the controller for positioning the object relative to the sample.

3. The high resolution material observation system according to claim 1, wherein the detector is operable to measure a near-field response, and wherein the detector is a near-field microscope which measures the near-field infrared emission.

4. The high resolution material observation system according to claim 1, wherein:
    the object and the thermal excitation unit comprise a resistive heater, wherein the resistive heater has a length dimension and a width dimension, the length dimension being substantially equal to one half of a wavelength of the near-field infrared emission and the width dimension being much less than the wavelength of the near-field infrared emission, the length dimension being perpendicular to the width dimension.

5. The high resolution material observation system according to claim 4, wherein the resistive heater further comprises a first plate and a second plate, each of the first plate and the second plate having a respective edge that is perpendicular to the length dimension and larger than the width dimension.

6. A method for high-resolution observation of material, the method comprising:
    thermally exciting, with a thermal excitation unit, a near-field infrared source, the near-field infrared source comprising one of an object having at least one spatial dimension sufficient to support production of near-field infrared emissions and a sample,
        the thermal excitation unit being thermally coupled conductively to the near-field infrared source so as to conduct thermal energy to and thermally excite the near-field infrared source, thereby generating a temperature difference between the object and the sample so as to cause black body radiation within the infrared spectrum;
    positioning the sample so as to place a near-field receiver in the near-field infrared emissions, wherein the near-field receiver is one of the object and the sample, and wherein the near-field receiver is different than the near-field infrared source; and
    measuring at least one of a far-field response and a near-field response, the at least one of the far-field response and the near-field response produced by an excitation of the near-field receiver by the near-field infrared emission produced by the near-field infrared source.

7. The method according to claim 6, wherein the positioning is performed by a controller communicatively coupled to the object and the sample, the controller for positioning the object relative to the sample.

8. The method according to claim 6, wherein the measuring comprises measuring a near-field response, and wherein a near-field microscope is used to measure the near-field infrared emission.

9. The method according to claim 6, wherein:
    the object and the thermal excitation unit comprise a resistive heater, wherein the resistive heater has a length dimension and a width dimension, the length dimension being substantially equal to one half of a wavelength of the near-field infrared emission and the width dimension being much less than the wavelength of the near-field infrared emission, the length dimension being perpendicular to the width dimension.

10. The method according to claim 9, wherein the resistive heater further comprises a first plate and a second plate, each of the first plate and the second plate having a respective edge that is perpendicular to the length dimension and larger than the width dimension.

11. A computer program product for high-resolution observation of material, the computer program product comprising:
   a storage medium readable by a processing circuit and storing instructions for execution by the processing circuit for performing a method comprising:
   thermally exciting, with a thermal excitation unit, a near-field infrared source, the near-field infrared source comprising one of an object having at least one spatial dimension sufficient to support production of near-field infrared emissions and a sample,
      the thermal excitation unit being thermally coupled conductively to the near-field infrared source so as to conduct thermal energy to and thermally excite the near-field infrared source, thereby generating a temperature difference between the object and the sample so as to cause black body radiation within the infrared spectrum;
   positioning the sample so as to place a near-field receiver in the near-field infrared emissions, wherein the near-field receiver is one of the object and the sample, and wherein the near-field receiver is different than the near-field infrared source; and
   measuring at least one of a far-field response and a near-field response, the at least one of the far-field response and the near-field response produced by an excitation of the near-field receiver by the near-field infrared emission produced by the near-field infrared source.

12. The computer program product according to claim 11, wherein the positioning is performed by a controller communicatively coupled to the object and the sample, the controller for positioning the object relative to the sample.

13. The computer program product according to claim 11, wherein the measuring comprises measuring a near-field response, and wherein a near-field microscope is used to measure the near-field infrared emission.

14. The computer program product according to claim 11, wherein:
   the object and the thermal excitation unit comprise a resistive heater, wherein the resistive heater has a length dimension and a width dimension, the length dimension being substantially equal to one half of a wavelength of the near-field infrared emission and the width dimension being much less than the wavelength of the near-field infrared emission, the length dimension being perpendicular to the width dimension.

15. The computer program product according to claim 14, wherein the resistive heater further comprises a first plate and a second plate, each of the first plate and the second plate having a respective edge that is perpendicular to the length dimension and larger than the width dimension.

* * * * *